April 10, 1962   L. O. GREELEY   3,028,699
LOCKING CLAMP

Filed July 10, 1958   2 Sheets-Sheet 1

INVENTOR.
LEO O. GREELEY
BY
ATTORNEYS

April 10, 1962  L. O. GREELEY  3,028,699
LOCKING CLAMP

Filed July 10, 1958  2 Sheets-Sheet 2

INVENTOR.
LEO O. GREELEY
BY Price and Henweld
ATTORNEYS

United States Patent Office 3,028,699
Patented Apr. 10, 1962

3,028,699
LOCKING CLAMP
Leo O. Greeley, Cadillac, Mich., assignor to F. J. McCarthy, Inc., Cadillac, Mich., a corporation of Michigan
Filed July 10, 1958, Ser. No. 747,702
4 Claims. (Cl. 37—159)

This invention relates to a clamping means for releasably clamping two members together. More particularly, this invention relates to a clamping means especially adapted for releasably clamping a beam on which a road scraper blade is mounted to the segment which traces the arc through which the beam is rotated for positioning of the blade.

Many types of clamping means are already in existence. However, certain conditions and situations require clamping means adapted to function in a particular manner. One such situation is road maintenance machinery, where the equipment must be adjusted and locked into position for different types of conditions and terrain. For example, a road scraping blade must constantly be adjusted to adapt it to its environment. When the adjustment is made, the blade must be locked positively in position. The clamping means must be of a type which is simple, yet very sturdy; economical to manufacture, yet extremely durable. It must be designed to fit and move within the frame work of the scraper unit. It must absolutely prevent horizontal rotative movement of the blade. It must be able to be remotely controlled and set and lock the blade in an infinite number of positions. It must remain operative and immune to the adverse conditions of its use such as, dirt and ice.

It is therefore an object of this invention to provide a clamping means which is simple, compact, dependable, durable, low in cost and maintenance, and easy to manufacture. It substanitally eliminates the operational failures caused by ice, dirt and corrosive substances frequently characteristic of road machinery environment. This invention is especially adapted for use on scraper blades of road maintenance and construction equipment.

Other objects of this invention will become obvious to those skilled in the art of heavy machinery upon reading the accompanying specification and an examination of the accompanying drawings, wherein.

Figure 1:
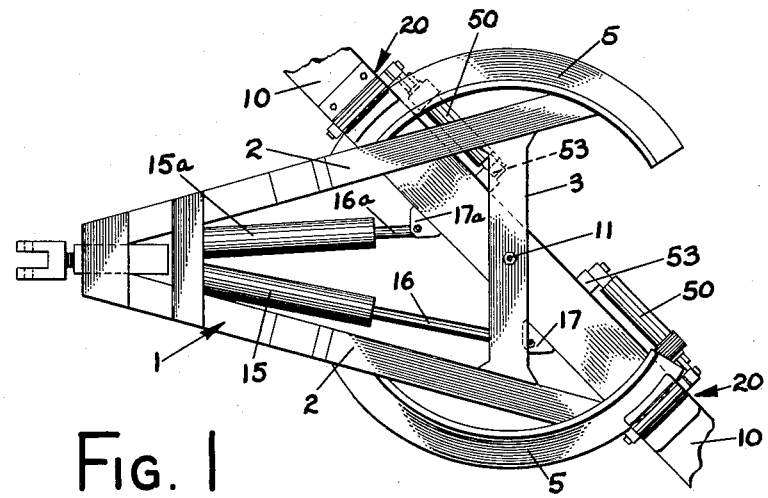
FIG. 1 is a plan view of the scraper blade mounting frame showing the clamps of this invention.
Figure 2:
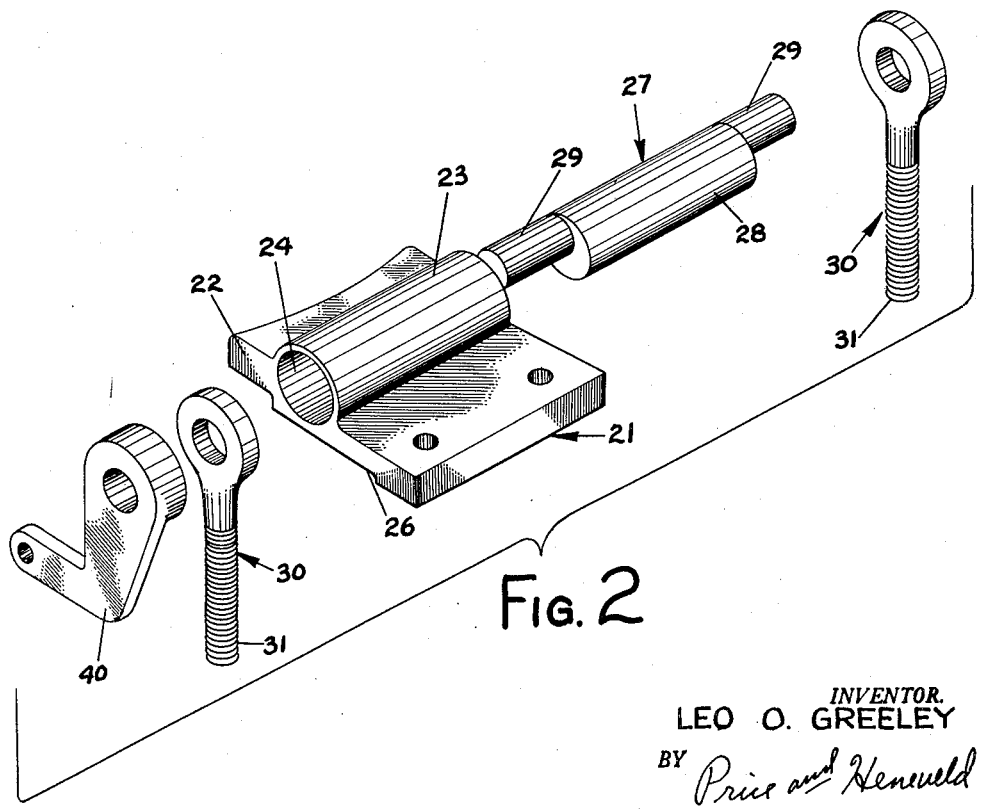
FIG. 2 is an enlarged exploded perspective view of the parts comprising the clamping means.
Figure 3:
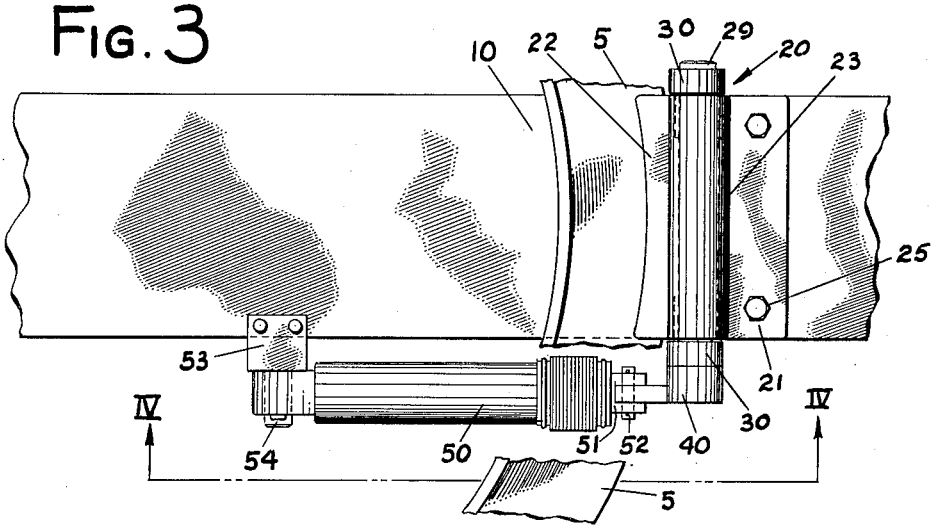
FIG. 3 is an enlarged fragmentary plan view of the clamping means mounted on the beam and engaging the segment and illustrating the segment partially broken away.

Briefly, this invention relates to clamping means for releasably clamping two members together, comprising a clamping plate attached to the first member in a manner allowing it limited vertical movement. The clamping plate has a shaft opening therethrough and includes a clamping finger adapted to lie over the second member. The central axis of the shaft opening is generally stationary. A rocking shaft, having a body eccentric to the ends thereof, is mounted within the shaft opening, such that the eccentric body lies within it. A stop means engages the rocking shaft to limit the extent of vertical movement of the eccentric ends of the rocking shaft relative to the first member. The rocking shaft has a rocker arm and means to actuate the unit. Rotation of the rocker arm causes the rocking shaft to rotate, thereby causing the eccentric body to rotate within the shaft opening. The rocking shaft is positioned within the shaft opening so that when the ends of the rocking shaft reach the limit of vertical movement, further rotation of the shaft forces the clamping plate against the first member. This clamps the second member between the first member and the clamping finger. Rotation of the rocking shaft in the other direction releases the clamping means.

Referring now to the drawings, the reference numeral 1 designates an A-frame of a conventional type adapted to be mounted beneath the body frame of a truck. Mounted on the legs of the A-frame are the curved, C-shaped stationary segments 5. A beam 10, on which a road scraper blade is mounted, is suspended from the A-frame, and is adapted to be pivoted by the cylinder and piston assemblies 15 and 15a. The clamping means 20 releasably clamp the beam 10 to the stationary segments 5, allowing the beam to be rotated for horizontal angular adjustment.

The A-frame 1 includes the legs 2 and the cross bar 3. This structure is old and well known and is adapted to be mounted beneath the body frame of a truck. The A-frame is so mounted to the truck that it may be tipped about the longitudinal axis of the truck in order that its angular relationship may vary with respect to the truck body. Each segment 5 is comprised of an L-shaped angle and is welded to a leg of the A-frame itself. By means of pivot bolt 11, the beam 10 is suspended from the cross bar 3 below the A-frame. The cylinder and piston assemblies 15 and 15a are mounted below the A-frame, reciprocating the rods 16 and 16a respectively, which are pivotally connected to the beam 10 at 17 and 17a, on each side of the pivot bolt 11. All of this structure is old and well known in the art of road maintenance equipment. By operation of the cylinder and piston assemblies 15 and 15a, the beam 10 may be pivoted to any desired position for work that must be done.

The clamping means 20 includes a clamping plate 21 mounted by attachment bolts 25 on the top of the beam 10 radially beyond the segments 5. This clamping plate is loosely mounted permitting it to rock vertically about the attachment bolts 25. The clamping plate includes a clamping finger 22, which extends and lies over the segment. Thus, when the clamping plate 21 is rocked in the manner described above, the clamping finger 22 will move vertically with relation to the beam. The clamping plate 21 only contacts the beam 10 at its point of attachment, a relief 26 being provided for this purpose. This allows the clamping plate 20 to operate effectively regardless of ice or dirt collecting on the beam, which will be fully described hereinafter. A boss 23 houses a shaft opening 24 extending through the clamping plate 21, generally parallel to the clamping finger 22.

A rocking shaft 27 is mounted within the shaft opening 24. The rocking shaft 27 has a body 28 eccentric to the end pins 29 thereof. The eccentric body 28 is seated within the shaft opening 24 of clamping plate 21, with the end pins 29 extending from each end of the shaft opening. Eyebolts 30 are mounted on the end pins 29 of the rocking shaft 27, the shanks 31 thereof extending downwardly along the sides of the beam 10. Stationary stop blocks 35 are mounted near the bottom of the beam 10. Each stop block is adapted to slidably receive the lower end of the shank 31 of an eyebolt 30. Beneath the stop blocks 35, the shanks 31 of eyebolts 30 are equipped with nuts 36. The purpose of the stop blocks 35 is to limit vertical travel of the eyebolts and thereby limit the vertical movement of the end pins 29 relative to the beam 10.

A generally L-shaped rocker arm 40 is secured to one of the end pins 29 of the rocking shaft 27. An actuating cylinder assembly 50 is mounted on the same side of the beam as the rocker arm 40. The actuating cylinder assembly is attached to an anchor block 53 by a pivot bolt 54, allowing the cylinder to rock about this bolt. The outer end of the piston rod 51 is operatively connected to the end of the rocker arm 40 by the stud pin 52. It will now be obvious that the rod 51 is adapted to rotate the rocker arm 40. Rotation of the rocker arm 40 causes rocking shaft 27 to rotate. Because the body 28 of the rocking shaft is eccentric, rotation of the rocking shaft 27 causes the end pins 29 to move up or down, depending on the direction of rotation. However, the extent of vertical movement of the end pins 29 is limited by engagement of the nuts 36 against the stop blocks 35. Therefore, as the rod 51 is moved to the left, as shown in FIG. 4, by the retraction of the actuating cylinder assembly 50, the rocker arm 40 rotates the rocking shaft 27 and the eccentric body 28 raises the end pins 29 upwardly until the nuts 36 are drawn firmly against the stationary blocks 35.

Figure 4:
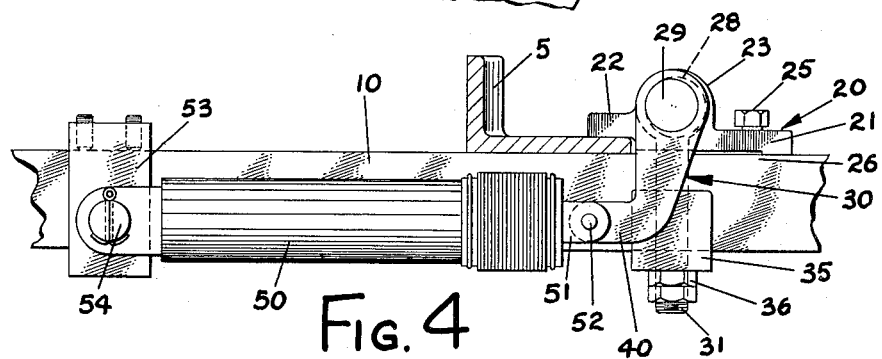
FIG. 4 is an enlarged side view taken along the plane IV—IV of FIG. 3, illustrating the clamping means in locked position.

This mechanical result occurs because the eccentricity of the eccentric body 28 is to the right of the end pins 29 as seen in FIG. 4. Thus as the shaft 27 is rotated clockwise the eccentricity shifts downwardly as indicated in FIG. 4. Since the clamping plate 21 provides no fixed vertical position for the shaft 27, further rotation of shaft 27 results in forcing the clamping plate 21 down towards the beam 10 since further upward movement of the eyebolts 30 is prevented by the stop blocks 35. Thus a substantial mechanical advantage is gained both through the rocker arm 40 and the eccentric body 28, giving a tremendous clamping power.

Figure 5:
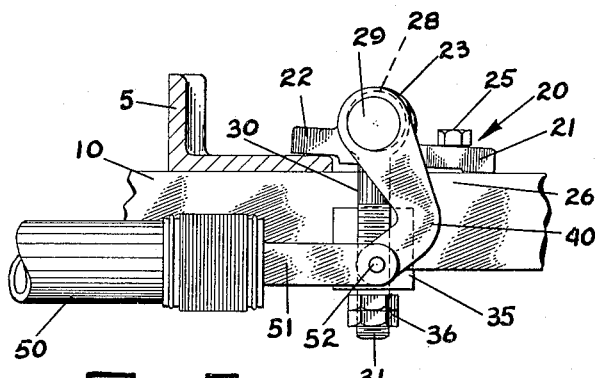
FIG. 5 is a fragmentary view similar to FIG. 4 illustrating the clamping means in unlocked position.

Rotation of shaft 27 in the opposite direction (i.e. counter-clockwise) (FIG. 5) lowers the end pins 29, releasing the clamping finger 22 from the segment 5. As FIG. 5 shows, the clamping finger 22 merely rests on segment 5 in this position. The clamping means 20 is then in unlocked position and operation of the cylinder and piston assembly 15 and 15a will rotate the beam 10 about the pivot bolt 11, the clamping fingers 22 riding on the segments as beam 10 pivots. When the beam 10 is rotated to the desired position, the cylinder and piston assembly 50 may be operated to retract the rods 51 to the left as shown in FIG. 4, again firmly locking the beam to the segment.

*Assembly and Operation*

The clamping means is assembled and mounted as follows. It must be understood that the clamping means shown in the drawings is designed to be used in conjunction with equipment mounted beneath a truck. However, this invention may be utilized as a clamping means for a wide variety of equipment. In its present embodiment, a clamping plate 21 is mounted on the beam 10 with the attachment bolts 25, such that the clamping plate may rock vertically relative to the beam about its attachment bolts. The clamping finger 22 extends over and rests on the segment 5. The rocking shaft 27 is inserted through the shaft opening 24, such that its eccentric body 28 lies within the shaft opening. Preferably, rocking shaft 27 is positioned within shaft opening 24 with its eccentricity to the right as shown in FIG. 4. Thus, when the shaft 27 is rotated the end pins 29 will move vertically relative to beam 10. The eyebolts 30 are secured, one on each end pin 29 of the rocking shaft 27, with the shanks 31 thereof extending downward along each side of the beam 10. The shanks 31 of eyebolts 30 extend slidably through the stationary stop blocks 35. The nuts 36 are secured to the lower ends of shanks 31 of eyebolts 30. The vertical movement of the end pins 29 of shaft 27 relative to the beam 10 is thus limited. The rocker arm 40 is then secured to an end pin 29 of the rocking shaft 27. Mounted on the same side of the beam 10 as the rocker arm 40, is a hydraulic cylinder assembly 50, which controls the rod 51, rotatably attached by means of stud pin 52. One such clamping means 20 is mounted outwardly of each segment 5 on the beam 10.

The operation of this clamping means is as follows. When the truck operator desires to change the position of the scraper blade, means are provided in the cab of the truck whereby the cylinder and piston assemblies 50 may be operated. These cylinder and piston assemblies 50 control the rods 51 which in turn rotate the rocker arm 40. As the rod 51 moves to the right as shown in FIG. 5, the rocker arm rotates the rocking shaft 27. The eccentric body 28 of the rocking shaft 27 rotates within shaft opening 24 causing the end pins 29 to drop relative to the beam 10. When in this position, the clamping fingers 22 of clamping plates 27 merely rest on the surfaces of segments 5. The truck operator then operates cylinder and piston assemblies 15 and 15a to pivot the beam 10 about the pivot bolt 11 in the cross bar 3 of the A-frame 1. When the road scraper blade has been moved to the desired position, cylinder and piston assemblies 50 are actuated to move the rods 51 to the left as shown in FIG. 4. This rotates rocker arm 40 of each clamping means 20 and in turn rotates rocking shaft 27 in the opposite direction. The eccentric body 28 within shaft opening 24 of clamping plate 21 raises the end pins 29 relative to the beam 10 until stop blocks 35 prevent further vertical movement. Further rotation of shaft 27 forces the clamping finger 22 tightly against the surface of the segment 5. Because the end pins 29 are limited in vertical movement, and because clamping plate 21 is free to rock, the eccentric body 28 forces the clamping plate towards the beam 10. The segment 5 is clamped between beam 10 and clamping finger 22. A high clamping pressure is exerted because the force of rod 51 is applied through the arm 40 and also throughout the eccentricity of body 28 of shaft 27. These effect accumulative mechanical advantage.

The eccentricity is preferably to the right as shown in FIG. 4 because when in clamped position, the rod 51 will be retracted and enclosed from dirt and moisture. Since the device is normally clamped, this reduces exposure of the moving parts. However, it must be understood that this invention can also be practiced by having the eccentricity to the left, although the rod 51 would then be exposed when clamping means 20 is locked.

It will be noted that a clamping means has been provided which is simple and very compact. It is dependable, very durable, low in cost and maintenance and is easy to manufacture. The unit is small enough to stay within the silhouette of the scraper unit, and therefore does not interfere with the truck structure. The design is such that it positively prevents operational difficulty due to dirt, ice, etc., collecting on the segment of the beam. The clamping finger 22 always rests on segment 5, and when beam 10 is rotated, the clamping finger scrapes along segment 5 removing foreign materials. Thus, dirt and ice cannot collect under clamping finger 5. This device positively holds the blade against any type of horizontal rotative movement. It is controlled from within the cab. This eliminates the necessity of the operator leaving the cab to adjust the blade's position It is adapted to lock the blade in an infinite number of positions along the segments.

A cover may be placed over the bottom end of the eyebolts 30 to keep ice and dirt from accumulating on the clamping means. The device is especially well adapted to be utilized in conjunction with road maintenance equipment, but it is not limited thereto.

Because the principles of this invention may be practiced in various other embodiments, it should thus be understood that these other embodiments are included within the spirit and scope of this invention unless the accompanying claims expressly state otherwise.

I claim:
1. A clamping means for releasably clamping a beam on which a road scraper blade is mounted to any point on an arcuate segment comprising: a clamping plate loosely attached to the beam by a plurality of bolts along one edge of said plate, said clamping plate adapted to rock on said bolts about said edge and having a clamping finger extending above and in sliding contact with the segment; said clamping plate having a peripherally closed shaft opening therethrough; said clamping finger and said shaft opening being offset from said attachment means in the same direction; the axis of said shaft opening lying generally normal to said clamping finger; a rocking shaft rotatably mounted within said shaft opening, a rocker arm mounted on said rocking shaft, said rocking shaft having ends of relatively smaller diameter extending from said shaft opening, said ends being eccentric to the body of said rocking shaft and to said shaft opening; eyebolts mounted on said ends; said eye bolts having enlarged portions encircling said ends to substantially close the axial ends of said housing and thereby prevent entrance of dirt, ice and mud; a stop block mounted on the beam slidably receiving said eyebolts; means mounted on the lower portions of said eyebolts adapted to bear against said stop block when said eyebolts move vertically, thereby limiting the vertical movement of said eyebolts relative to said stop block; and said rocking shaft positioned within said shaft opening whereby rotation of said rocker arm in the direction raising said ends forces said clamping plate towards the beam when said stop block limits the vertical movement of said ends, thereby clamping the segment between the beam and said clamping finger.

2. A road scraper mechanism comprising: a support framt adaptable to mounting in a horizontal position under a truck; oppositely positioned arcuately shaped guide means fixedly secured to said frame in a horizontal position and including a horizontal flange; a scraper-blade-receiving beam pivotally mounted to the underside of said frame to enable horizontal pivotal movement of said beam about said mount; said beam being in contact with said flange; power motor means operably connected between said frame and said beam to rotate said beam about said pivotal mount; a clamping means between said beam and each of said arcuate guides; each of said clamping means including a plate loosely and thus rockably mounted on top of said beam, and having a clamping finger extending over said flange and in sliding engagement therewith; each of said plates including a collar-type housing boss; a rocking shaft in each of said housings and including ends extending from said housing; said ends being eccentric with respect to the portion of said shaft in said housing; stud means on said ends of each shaft and extending downwardly on each side of said beam; a stop means on said beam; said stud means each having a stop element engaging said stop means for limited movement therebetween; a rocker arm mounted on said rocker shaft; and a reciprocating power motor means connected between each of said rocker arms and said beam whereby with actuation of said last mentioned motor means, each of said rocker shafts may be rotated to alternately clamp or unclamp said beam to said flange in various positions on said arcuate guide.

3. The apparatus in claim 2 wherein said housing is continuous to enclose the periphery of said rocking shaft, and wherein said stud means comprises a pair of eye bolts having enlarged portions around said extended ends to enclose the ends of said housing and thereby prevent the entrance of dirt, ice, and the like.

4. The apparatus in claim 2 wherein said reciprocating power motor means are generally coplanar with said beam to forestall road hazards thereto.

References Cited in the file of this patent

UNITED STATES PATENTS

| 50,597 | Jones | Oct. 25, 1865 |
| 440,240 | Honk | Nov. 11, 1890 |
| 682,786 | Caldwell | Sept. 17, 1901 |
| 1,397,930 | Jefferies | Nov. 22, 1921 |
| 1,472,617 | Schwartz | Oct. 30, 1923 |
| 1,840,820 | Price | Jan. 12, 1932 |
| 1,863,039 | Chandler | June 14, 1932 |
| 1,865,587 | Price | July 5, 1932 |
| 1,988,240 | Ellis | Jan. 15, 1935 |
| 2,511,592 | Krafczuk | June 13, 1950 |
| 2,556,348 | Thompson | June 12, 1951 |
| 2,680,459 | Dodson et al. | June 8, 1954 |
| 2,690,088 | Wiglesworth | Sept. 28, 1954 |
| 2,815,052 | Krasnow | Dec. 3, 1957 |
| 2,894,307 | Hogan et al. | July 14, 1959 |

FOREIGN PATENTS

| 19,598 | Great Britain | of 1899 |
| 636,520 | Great Britain | May 3, 1950 |

OTHER REFERENCES

Airop Air-Operated Clamps, June 17, 1943.